United States Patent [19]

Antoni

[11] 4,288,085
[45] Sep. 8, 1981

[54] FORCE ACTUATED JAW CHUCK

[75] Inventor: Herbert Antoni, Grevenbroich, Fed. Rep. of Germany

[73] Assignee: Paul Forkardt Kommanditgesellschaft, Düsseldorf, Fed. Rep. of Germany

[21] Appl. No.: 116,359

[22] Filed: Jan. 28, 1980

[30] Foreign Application Priority Data

Feb. 2, 1979 [DE] Fed. Rep. of Germany ....... 2903904

[51] Int. Cl.³ ............................................. B23B 31/16
[52] U.S. Cl. ..................................... 279/121; 279/110
[58] Field of Search .......................... 279/70, 121, 110

[56] References Cited

U.S. PATENT DOCUMENTS

| | | | |
|---|---|---|---|
| 2,697,612 | 12/1954 | Sloan | 279/121 |
| 3,424,468 | 1/1969 | Steinberger et al. | 279/121 |
| 3,494,627 | 2/1970 | Pirman | 279/121 |
| 3,515,400 | 6/1970 | Jendry | 279/121 |

*Primary Examiner*—Robert D. Baldwin
*Attorney, Agent, or Firm*—Martin A. Farber

[57] ABSTRACT

A power operated jaw chuck with clamping jaws which can each be operated by a chuck piston movable axially within a bore in a chuck body via a separate wedge-hook transmission comprising wedge surfaces inclined in the axial direction which are formed in the circumferential direction in pairs on the chuck piston and on a wedge hook. In order to obtain higher load-bearing capacity of the wedge hook transmission without increasing the required space, the wedge hook is formed with a T-shaped cross section having a continuous wedge surface for internal clamping on the radially inner base surface and having a web which simultaneously serves as a connecting member with the rear side of the clamping jaw. Ledge-shaped wedge pieces are formed on the chuck piston on both sides of the web. The wedge pieces extend in the circumferential direction of the chuck piston up to the web of the clamping jaw, are supported via their partially cylindrical outer surface in the bore of the chuck body which is provided for the chuck piston, and cooperate for external clamping via an inner wedge surface with respectively each one wedge surface of the wedge hook.

6 Claims, 4 Drawing Figures

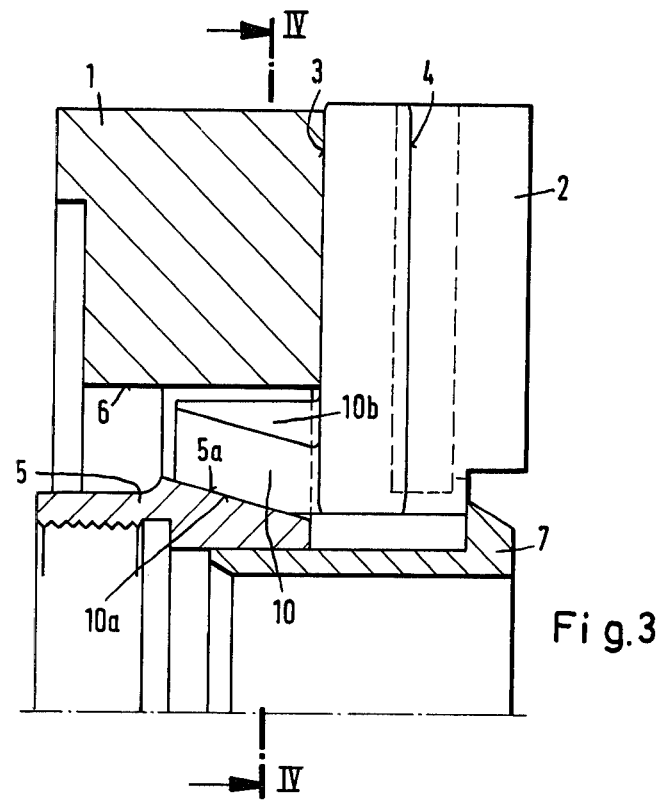
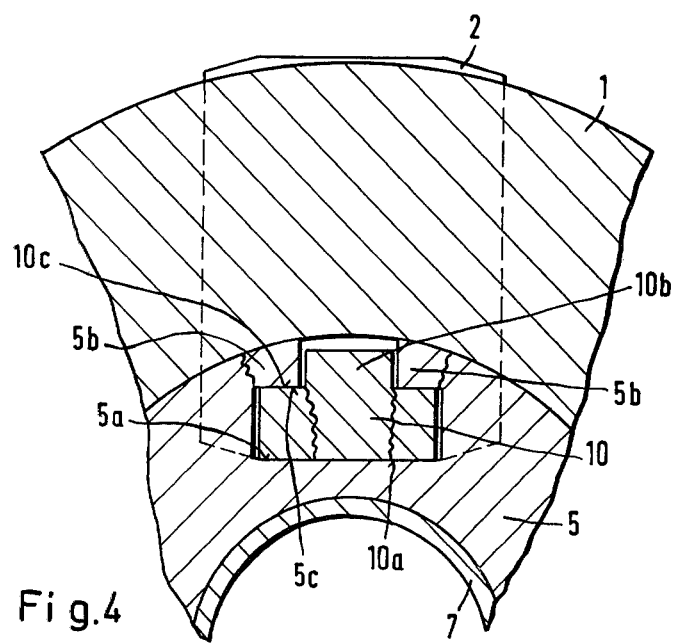

FORCE ACTUATED JAW CHUCK

The present invention relates to a power-actuated jaw chuck, particularly a hollow chuck, with clamping jaws guided in radially displaceable manner in a chuck body, each of which is actuatable by a chuck piston axially movable in the chuck body by means of an individual wedge-hook transmission which comprises wedge surfaces inclined in an axial direction and developed in radial and in circumferential directions, in pairs, on the one hand on the chuck piston and on the other hand on a wedge hook which is arranged on the rear inner part of each clamping jaw.

In the known jaw chucks of the above-mentioned type, the wedge hook transmission for each clamping jaw consists of wedge hooks developed both on the clamping jaw and on the chuck piston, each engaging into a groove in the other part. The pair-wise wedge surfaces in the case of the external clamping of a workpiece are located on the radially inner part of the chuck-piston wedge hook and on the radially inner surface of the groove developed for this chuck-piston wedge hook on the wedge hook of the clamping jaw. In order to permit internal clamping of a workpiece, a wedge surface is located on the radially outer part of the chuck-piston wedge hook and cooperates with the externally lying wedge surface of the groove in the clamping jaw.

In this known embodiment, both the wedge hooks of the clamping jaws and the wedge hooks of the chuck piston are acted on in flexure and shear. For this reason the radial thickness of both wedge hooks is made the same. The radial thickness of the wedge hooks in the endangered cross sections is therefore controlling for the load-bearing capacity of the known wedge-hook transmission and therefore for the obtainable amount of clamping force of the jaw chuck.

Due to the existing space requirements, the radial thickness of the wedge hooks cannot be freely selected. In particular in the case of hollow chucks having a continuous central bore for the passing therethrough of bar-shaped workpieces, the largest possible free passageway is desired. This requirement stands against the necessity of maintaining the outside diameter of the chuck piston as small as possible since it limits radially from the inside the rear guide paths in the chuck body for the guide surfaces of the base jaws. A large chuck-piston diameter therefore necessarily results in shortened rear guide paths for the clamping jaws, due to which a canting of the clamping jaws within the chuck body and thus a poorer efficiency and increased wear in the jaw guides are produced.

It is the object of the invention to make a higher load-bearing capacity of the structural parts possible by a different shaping of the clamping jaws and of the chuck piston in the region of the wedge-hook mechanism without the space available being required to be increased.

The solution for this problem provided by the invention is aided by the the wedge hook of the clamping jaws being developed T-shaped in cross section with a wedge surface for internal clamping which extends through or is continuous on the radially inner base surface and with a web which serves at the same time as a connecting member for the rear of the clamping jaw, and that ledge-shaped wedge pieces are developed on the chuck piston on both sides of the web which extend in the circumferential direction of the chuck piston up to the web of the clamping jaw, rest via their partially cylindrical outer surface in the bore of the chuck body provided for the chuck piston, and cooperate by an inner wedge surface each one wedge surface of the wedge hook for an external clamping.

By the development of the wedge hook transmission in accordance with the invention, the wedge hook in case of internal clamping rests with its radially inner base surface which is formed as a continuous wedge surface against the bottom of the corresponding recess in the chuck piston, as a result of which not only is the load per unit of surface reduced with this type of clamping, but smaller tilting moments for the clamping jaw are produced due to the fact that the point of attack of the force lies far towards the inside. The use on both sides of the web of ledge-shaped wedge pieces which extend in the circumferential direction of the chuck piston up to the web of the clamping jaw results in a large-area support for those parts of the chuck piston (which parts are placed under load upon external clamping) on the bore in the chuck body which is provided for the chuck piston, in which connection, due to the fact that the ledge-shaped wedge pieces extend up to the narrow web of the clamping-jaw wedge-hook, flexural and shearing stresses are avoided in the transition between the ledge-shaped wedge pieces and the adjoining part of the chuck piston as soon as the very small guidance play between the chuck piston and the bore of the chuck body is eliminated by elastic deformation of the ledge-shaped wedge pieces. The stresses on the ledge-shaped wedge pieces provided for external clamping are thus very substantially reduced in the embodiment according to the invention since, after slight elastic deformation, there are no longer any flexural and shear stresses.

By the development of the wedge-hook mechanism in accordance with the invention it becomes possible, in accordance with another feature of the invention, to make the radial thickness of the wedge hooks which are formed on the clamping jaws greater than the radial thickness of the ledge-shaped wedge pieces of the chuck piston since the ledge-shaped wedge pieces rest with large area on the bore of the chuck body, with the avoidance of shearing and flexural stresses. In this way the load-carrying capacity of the chuck-jaw wedge hook can be considerably increased, particularly as, for instance, a 30% increase in the radial thickness results in an approximately 70% increase in the load-bearing capacity, since the load-bearing capacity varies as the square of the radial thickness.

With the above and other objects and advantages in view, the present invention will become more clearly understood in connection with the detailed description of a preferred embodiment, when considered with the accompanying drawings, of which:

FIG. 3 is a longitudinal section corresponding to FIG. 1 through a jaw chuck in accordance with the invention; and FIG. 4 is a cross section through the jaw chuck of the invention along the section line IV—IV of FIG. 3.

Figure 1:
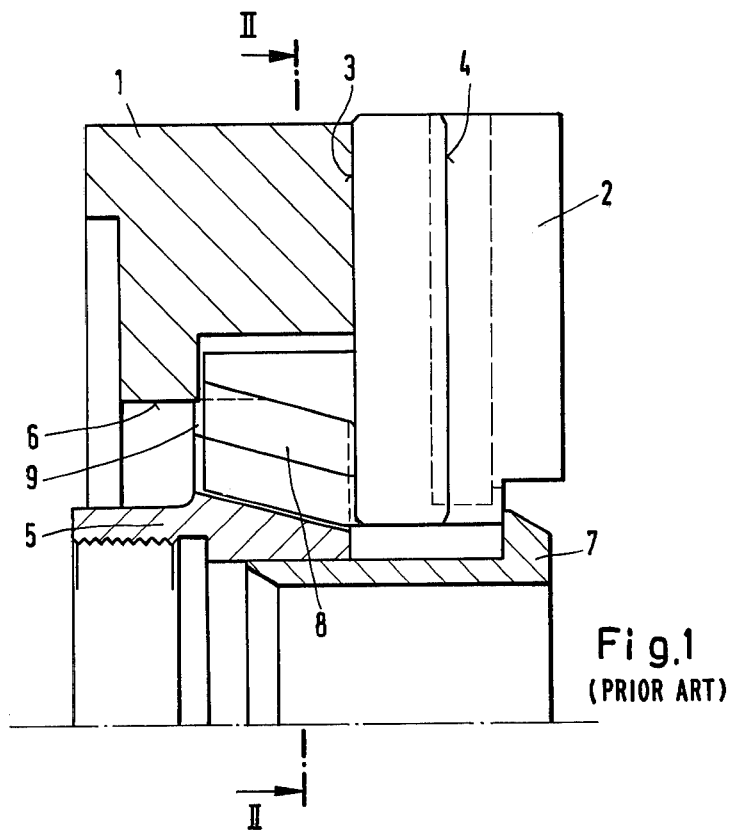
FIG. 1 is a longitudinal section through a power-operated jaw chuck of known construction.
Figure 2:
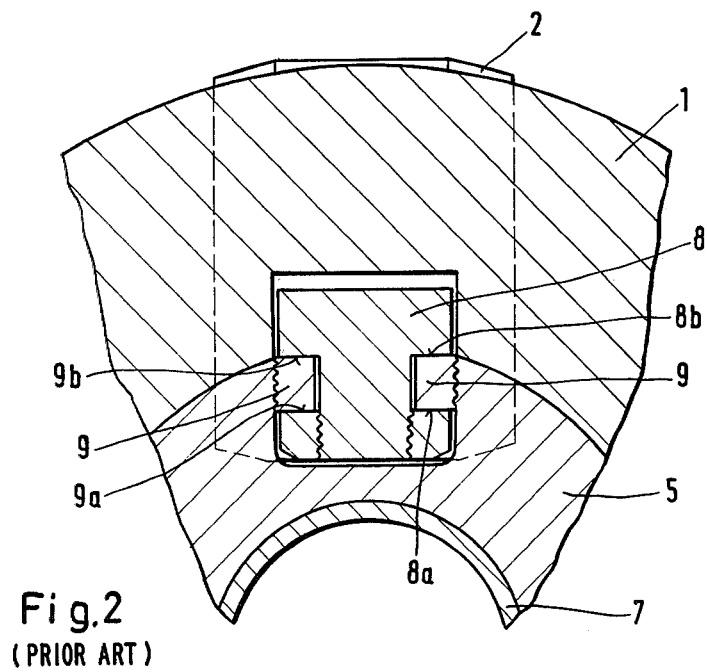
FIG. 2 is a cross section along the section line II—II of FIG. 1.

The jaw chuck in accordance with the prior art which is shown in FIGS. 1 and 2 has, in the same way as the jaw chuck of the invention shown in FIGS. 3 and 4, a chuck body 1 within which several clamping jaws 2 are guided in radially displaceable manner. For this purpose the clamping jaws 2 have guide surfaces 3 and 4 which cooperate with corresponding guide tracks in the chuck body 1. The radial displacement of the clamping jaws 2 is effected by means of a chuck piston 5 which is displaceable axially in a borehole 6 in the chuck body 1 and is covered by a protective bushing 7 on the front side of the clamping chuck.

In the known jaw chuck shown in FIGS. 1 and 2, each clamping jaw 2 cooperates by means of a double-T-shaped wedge hook 8 with the chuck piston 5 which is provided for this purpose with two lateral wedge hooks 9 which engage into a corresponding groove on both sides of the clamping jaw wedge-hook 8. This can best be noted from FIG. 2.

The connection between the wedge hooks 8 and 9 is effected by wedge surfaces inclined in an axial direction, the radially inner wedge surfaces 8a of the clamping-jaw wedge hook 8 and the corresponding wedge surfaces 9a of the chuck-piston wedge hook 9 being used for the external clamping of workpieces. The internal clamping of workpieces is effected by radially outer wedge surfaces 8b of the clamping-chuck wedge hook 8 and corresponding wedge surfaces 9b of the chuck-piston wedge hook 9.

By the development with the double-T-shaped cross section of the wedge hook 8 arranged on the rear surface of each clamping jaw 2, the wedge hooks 9 of the chuck piston 5 cannot rest in the borehole 6 of the chuck body 1. Therefore, in the same way as the lateral projections of the wedge hook 8, they are stressed in flexure and shear. The endangered cross sections are indicated in undulated lines in FIG. 2.

In order to create room for the wedge hooks 8 of the clamping jaws 2, not only are recesses provided in the chuck body 1 (see FIG. 2), but the cylindrical outer surface of the chuck piston 5 is interrupted over a relatively large width. This has the result that, upon actuation of the chuck piston 5 by axial displacement, the piston wedge hooks 8 are loaded in flexure and shear under the force of the clamping jaws, which, in the event of overloading, can lead to fractures in the endangered cross sections. The wedge hooks 9 are loaded in similar manner in the endangered cross sections. The radial thickness of the wedge hooks 8 and 9 in the endangered cross sections is therefore controlling for the load-bearing capacity of the wedge-hook transmission and thus for the value of the clamping force of the jaw chuck which can be obtained.

Due to the existing space requirements, the radial thickness of the wedge hooks 8 and 9 cannot be freely selected. In particular in the case of hollow chucks having a continuous central borehole for the passage of rod-shaped workpieces the largest possible free passage is desirable. For this reason in the known embodiment only limited lengths are available for the radial thickness of the wedge hooks 8 and 9.

In the case of the jaw chuck of the invention, shown in FIGS. 3 and 4, the wedge-hook mechanism is developed in a manner different from that described above. Each clamping jaw 2 is provided on its radially inner rear part with a wedge hook 10 of T-shaped cross section which is developed, on its radially inner base surface, with a continuous wedge surface 10a for internal clamping. This wedge surface 10a cooperates with a similarly continuous wedge surface 5a of the chuck piston 5 so that not only is a slight surface pressure obtained but also a slight tilting moment of the clamping jaw 2. The wedge hook 10 furthermore has a web 10b which at the same time serves, without an increase in diameter, as a connecting member for the rear side of the clamping jaw 2, as can be noted in particular from FIG. 3. On the chuck piston 5 on both sides of the web 10b of the wedge-hook 10, there are ledge-shaped wedge pieces 5b which extend in the circumferential direction of the chuck piston 5 up to the web 10b. These wedge pieces 5b rest via their partially cylindrical outer surface against the cylindrical guide surface by elastic deformation of the bore 6 of the chuck body 1 for the chuck piston 5 even upon slight loading of the clamping jaws 2, overcoming the light play or clearance. In this way the stressing of these wedge pieces 5b by flexure and shear is practically completely avoided. The wedge surfaces 5c on the chuck piston 5 as well as 10c on the wedge hook 10 which are arranged for external clamping thus do not result in endangering the wedge pieces 5b in the endangered cross section, even under high load. This endangered cross section of the wedge pieces 5b is again shown in undulated lines in FIG. 4.

In FIG. 4 it can be noted that the ledge-shaped wedge pieces 5b are surrounded completely by the uninterrupted bore 6 in the chuck body 1. Upon loading the wedge-hook transmission, the wedge pieces 5b, after bridging over the generally very slight guide clearance or play be elastically against the surface of the bore 6 in the chuck body 1, are supported by same and therefore are not further stressed in shear and flexure even upon a further increase of the chuck clamping force in their endangered cross sections. The endangered cross sections therefore, in contradistinction to the known constructions, can be made weaker in or thinner the radial direction, without the danger of overstressing. Accordingly, the endangered cross sections of the wedge hook 10 which are stressed in shear and flexure are reinforced.

Since the moment of resistance of the endangered cross sections, which is the controlling factor for the permissible flexural stressing, increases as the square of the radial thickness of the wedge hook 10, a thickening of the wedge hook by about 30% results in an increase in the moment of resistance of about 70%. The entire wedge hook transmission can be subjected to a corresponding higher load with the same requirement as to space, in which connection the surface pressures occurring between the chuck parts can be maintained within permissible values by means of suitable structural design. Based on the same strengths of material, therefore, a jaw chuck in accordance with FIGS. 3 and 4 can be operated with a substantially higher clamping force than chucks of the traditional construction shown in FIGS. 1 and 2.

Another advantage of the construction in accordance with FIGS. 3 and 4 is the improvement of the precision in clamping, particularly in case of low load. In the unloaded or only slightly loaded condition, the chuck piston 5 of a jaw chuck in accordance with FIGS. 1 and 2 can assume, within the guide clearance with respect to the bore 6, any position whatsoever which differs from the actually desired position with respect to the axis of rotation of the chuck. This deviation in position is transmitted via the wedge hook transmission to the clamping jaws 2 and effects an undesired eccentric adjustment of the workpiece, the size and position of which can vary within the limits described. In the case of the chucks according to FIGS. 1 and 2, only a very high load can lead to the wedge hooks 9 of the chuck piston 5 and the adjacent regions of the chuck piston 5 being so extensively deformed that the guide play or clearance which is undesired for the precision of clamping is bridged over. If such chucks have been used for some time, this process can be subsequently noted from pressure spots which show themselves on the bore 6 in the chuck body 1 and on the corresponding opposing surfaces on the chuck piston 5.

In the construction shown in FIGS. 3 and 4, the ledge-shaped wedge pieces 5b of the chuck piston 5 place themselves without further structural measures against the guide surface of the bore 6 in the chuck body 1. In this connection it is advantageous that the supporting is effected, different than in the case of the known constructions, directly opposite the power-transmitting surfaces, whereby a relatively slight elastic deformation occurs in the endangered cross sections. Furthermore, the flexural stressing in the endangered cross sections remains extremely slight since these cross sections can be developed with a slight thickness extending in the radial direction.

I claim:

1. In a powered-operated jaw chuck, formed as a hollow chuck, with clamping jaws radially displaceably guided in a chuck body and adapted for external and internal clamping, each of the clamping jaws being actuatable, via a common chuck piston movable axially through a bore in the chuck body, by means of a separate wedge hook transmission, respectively, each said wedge hook transmission comprising wedge surfaces inclined in an axial direction and formed in a circumferential direction in pairs on the chuck piston and on a wedge hook, each said wedge hook being formed T-shaped in cross section with a web and has a radially innermost base surface which forms a continuous wedge surface adapted for the internal clamping cooperating with a wedge surface of the chuck piston, said wedge hook has other wedge surfaces laterally adjacent to the web respectively, said chuck piston is formed with ledge-shaped wedge pieces, said wedge pieces extend in the circumferential direction of said chuck piston substantially up to said web of the wedge hook, said wedge pieces cooperate respectively with said other wedge surfaces respectively of said wedge hook for the external clamping, the improvement wherein
said chuck body has an uninterrupted cylindrical guide surface defining said bore of the chuck body as a completely closed bore, said chuck piston is disposed in said bore,
each of said wedge pieces has a partial cylindrical outer surface, said partial cylindrical outer surface of each said wedge pieces is operatively supported in the bore of the chuck body against said cylindrical guide surface,
the clamping jaws each have a radially inwardly facing radially innermost free surface and a radially extending axially facing rear side, said rear side has a radially-inner end, said web constitutes means for connecting said wedge hooks, respectively, to said rear side at said radially-inner end of said rear side, with said wedge hooks formed on and arranged at the rear side at said radially-inner end of the rear side of a corresponding of said clamping jaws, respectively, spaced from said radially inwardly facing radially innermost free surface of said clamping jaw,
each said wedge hooks formed on said clamping jaws respectively has a radial thickness between said wedge surfaces thereof greater than the radial thickness of said ledge-shaped wedge pieces respectively of said chuck piston.

2. The jaw chuck according to claim 1, wherein said chuck piston is annular and has a large inner diameter relative to its annular thickness.

3. The jaw chuck according to claim 1, wherein said wedge pieces extend toward each other at both sides of said web,
each of said wedge pieces has a radially inner facing wedge surface, said inner facing wedge surfaces respectively cooperate with said other wedge surfaces, respectively, facing radially outwardly, of said wedge hook for the external clamping.

4. The jaw chuck according to claim 1, wherein said radial thickness of said wedge hook is the thickness from said web to said continous wedge surface of said wedge hook.

5. The jaw chuck according to claim 1, wherein said wedge pieces are completely surrounded by said uninterrupted cylindrical guide surface.

6. The jaw chuck according to claim 1, wherein each said wedge piece has a radially outermost surface spaced rearwardly from said rear side of said clamping jaws and radially inwardly spaced from said cylindrical guide surface.

* * * * *